United States Patent
Hsu et al.

(10) Patent No.: US 12,500,885 B2
(45) Date of Patent: Dec. 16, 2025

(54) SYSTEMS AND METHODS FOR AUTHENTICATION AND VALIDATION BASED ON USER CREDENTIAL AND BIOMETRIC DATA

(71) Applicant: Idemia Identity & Security USA LLC, Reston, VA (US)

(72) Inventors: Rein-Lien Hsu, Edison, NJ (US); Joseph R. Mayer, Wayne, NJ (US)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 255 days.

(21) Appl. No.: 18/186,789

(22) Filed: Mar. 20, 2023

(65) Prior Publication Data

US 2023/0308436 A1    Sep. 28, 2023

Related U.S. Application Data

(60) Provisional application No. 63/322,290, filed on Mar. 22, 2022.

(51) Int. Cl.
*H04L 9/40*    (2022.01)

(52) U.S. Cl.
CPC .............................. *H04L 63/0861* (2013.01)

(58) Field of Classification Search
CPC .......... H04L 63/0861; A63F 2300/532; H04W 12/068
See application file for complete search history.

(56) References Cited

U.S. PATENT DOCUMENTS

| | | | |
|---|---|---|---|
| 9,406,067 B1 * | 8/2016 | Robinson | G06Q 20/4016 |
| 10,740,447 B2 * | 8/2020 | Kwok-Suzuki | G06F 21/316 |
| 2016/0371438 A1 | 12/2016 | Annulis | |
| 2018/0253539 A1 | 9/2018 | Minter | |
| 2019/0268158 A1 * | 8/2019 | Lentini | H04L 9/30 |
| 2019/0311185 A1 * | 10/2019 | Jones | G06K 7/10722 |

OTHER PUBLICATIONS

7 Face Recognition Online Tools Ready to Use with Your Apps and Products, https://techbusinessguide.com/face-recognition-online-tools-ready-to-use-with-your-apps-and-products/ retreived Jul. 2021.
(Continued)

*Primary Examiner* — Jeffrey C Pwu
*Assistant Examiner* — Mayasa A. Shaawat
(74) *Attorney, Agent, or Firm* — Armstrong Teasdale LLP

(57) ABSTRACT

A system for authenticating a user includes a memory device, and a processor. The processor is configured to receive a first biometric sample associated with a user from a biometric measurement device, and receive, substantially contemporaneously with receiving the first biometric sample, an image of a user credential, where the image includes credential data, such as any of a variety of personally identifiable information. The processor may also be configured to compare the received first biometric sample to at least one of: i) a second biometric sample included in the credential data, or ii) a third biometric sample stored by an authentication database in association with the user. Likewise, in at least some embodiments, the processor may determine whether to authenticate the user, such as based upon the comparison.

16 Claims, 7 Drawing Sheets

(56) References Cited

OTHER PUBLICATIONS

Daptardar et al. "VQ Based Image Retrieval Using Color and Position Features. Data Compression Conference Proceedings," 10.1109/DCC.2008.106, 2008.
BioID "Face recognition liveness detection," https://www.bioid.com/ , retreived Jan. 2021.
How Does Online ID Verification Work https://www.docusign.com/blog/how-does-online-id-verification-work , Aug. 1, 2021.
Zhou et al., Learning Rich Features for Image Manipulation Detection, CVPR 2018.
Verifai: Automate the ID verification process in mobile and web services. https://www.verifai.com/en/ retrieved Jan. 2021.
Jumio Automated Identity Proofing, eKYC and Transaction Monitoring https://www.jumio.com/products/ retrieved Jan. 2021.
Idemia Desktop Document Authentication https://www.idemia.com/desktop-document-authentication retrieved Dec. 2021.

* cited by examiner

SYSTEMS AND METHODS FOR AUTHENTICATION AND VALIDATION BASED ON USER CREDENTIAL AND BIOMETRIC DATA

CROSS-REFERENCE TO RELATED APPLICATIONS

This application claims priority to U.S. Provisional Patent Application No. 63/322,290 filed on Mar. 22, 2022, titled Systems and Methods for Authentication and Validation Based on User Credential and Biometric Data, the entire contents of which are hereby incorporated herein by reference.

FIELD

The field of the disclosure relates generally to a system for authentication and validation based on user credential and biometric data, and more specifically, a system for authentication and validation based on user credential data and biometric data, such as one or more facial image samples and fingerprint samples.

BACKGROUND

Some traditional document validation systems verify that a credential document, such as a physical driver's license, a passport, or another form of identification document, contains valid information. For example, some conventional systems may verify that the information contained by a driver's license presented to a law enforcement or security officer is valid, inasmuch, for example, as the driver's license itself is not a fraudulent document. However, many such systems do not authenticate the identity of the individual presenting the credential document.

Rather, in many traditional validation scenarios, although a credential document presented may be valid, no additional mechanism exits for verifying that the person presenting the credential document is the actual individual identified by the credential document (e.g., the real owner of the document). As a result, in many real-world scenarios, sophisticated malicious individuals are, in at least some circumstances, capable of falsifying their identities by presenting valid, but illegally obtained, credential documents.

In addition to these shortcomings, in another example, criminal activity may be accomplished during a variety of online and other network- or internet-based transactions requiring the presentation of a valid identification document, such as a transaction instrument like a credit card, to proceed with a given transaction. In these circumstances, as above, valid credentials may be fraudulently presented by individuals who have illegally obtained the otherwise valid credentials.

Systems and methods for authentication and validation during the presentation of any of a variety of credential information, such as driver's license information, credit card information, and the like, are thus desired. More particularly, systems and methods for validation of credential data and biometrically authenticating a person presenting the credential data are desirable. Moreover, systems and methods for authentication and validation during presentation of physical as well as digital forms of identification and/or other personal transaction instruments, such as payment cards, are desirable.

BRIEF DESCRIPTION

In one aspect, a system for biometrically authenticating a user based upon a user credential is described. The system includes a memory device, and a processor. The processor is configured to receive a first biometric sample associated with a user from a biometric measurement device, and receive, substantially contemporaneously with receiving the first biometric sample, an image of the user credential, where the image includes credential data, such as any of a variety of personally identifiable information. The processor may also be configured to compare the received first biometric sample to at least one of: i) a second biometric sample included in the credential data, or ii) a third biometric sample stored by an authentication database in association with the user. Likewise, in at least some embodiments, the processor may determine whether to authenticate the user, such as based upon the comparison.

In another aspect, a system for biometrically authenticating a user based upon a user credential is described. The system includes a memory device, and a processor. The processor is configured to receive a first facial image associated with a user from an image capture device, and receive, substantially contemporaneously with receiving the first facial image, an image of the user credential, where the image includes a second facial image. The processor may also be configured to compare the received first facial image to at least one of: i) the second facial image included in the user credential, or ii) a third facial image stored by an authentication database in association with the user. Likewise, in at least some embodiments, the processor may determine whether to authenticate the user, such as based upon the comparison.

In yet another aspect, a system for biometrically authenticating a user based upon a user credential is described. The system includes a memory device, and a processor. The processor is configured to receive a first fingerprint sample associated with a user from biometric measurement device, and receive, substantially contemporaneously with receiving the first fingerprint sample, an image of the user credential. The processor is also configured to compare the received first fingerprint sample to a second fingerprint sample stored by an authentication database in association with the user. Likewise, in at least some embodiments, the processor may determine whether to authenticate the user, such as based upon the comparison.

DETAILED DESCRIPTION

Figure 1:
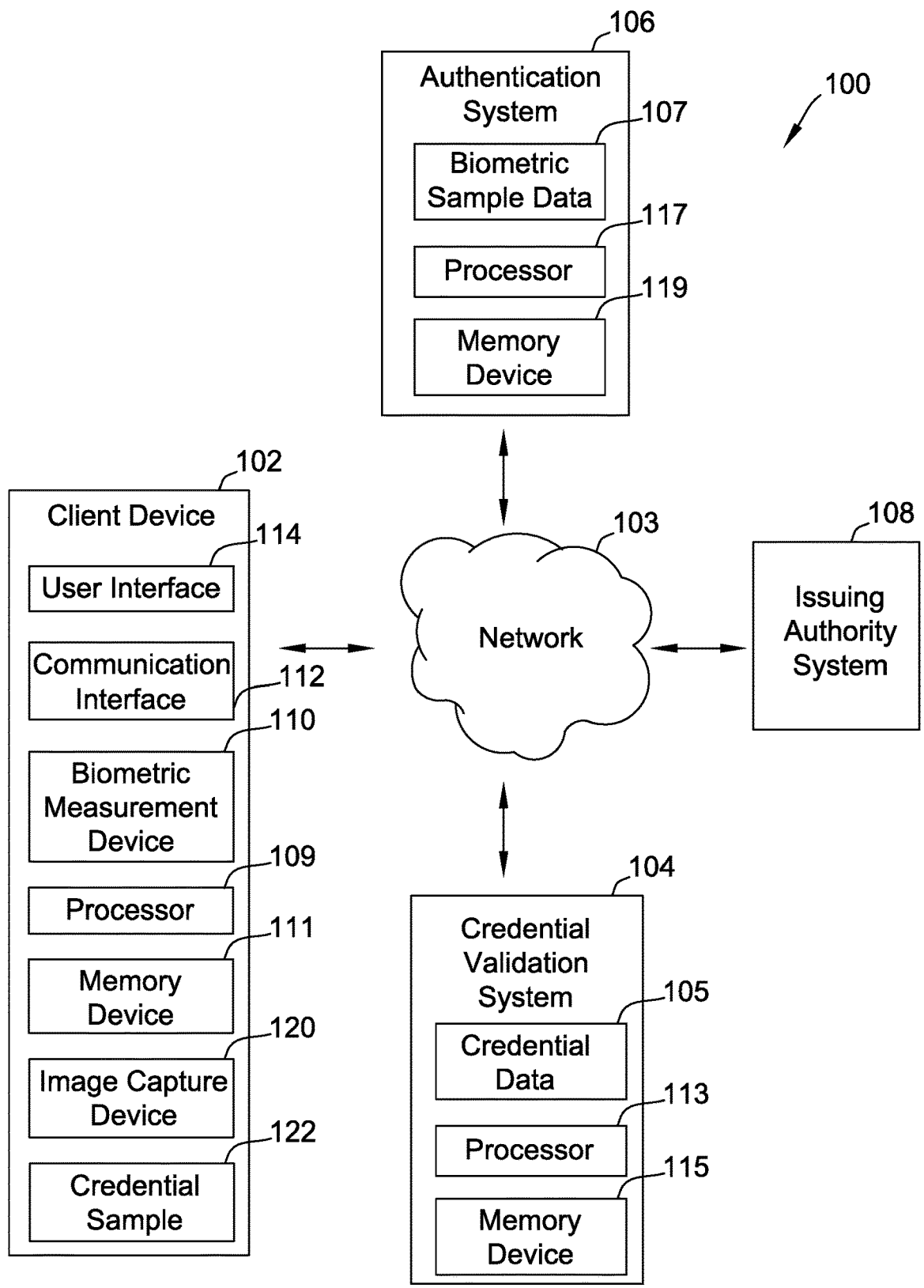
FIG. 1 is a block diagram illustrating an example embodiment of a system for authentication and validation based on user credential and biometric data.

Embodiments of the systems and methods described herein facilitate authentication and/or validation of a user based on user credential data and biometric data. For example, in some embodiments, a user credential, such as a photo identification or other credential document, may be presented by a user and an image thereof captured to obtain a biometric sample of the user provided on the user credential. Other credential data, such as any of a variety of personally identifiable information or "PII," demographic information, and the like may also be provided on the user credential and captured or scanned as well. In some cases, the credential data may also be encoded on the user credential, such as in the form of a quick response (QR) code, bar code, or any of a variety of other suitable visible or covert encoded formats.

In addition to obtaining the biometric sample and/or credential data, the systems described herein may obtain another biometric sample, such as biometric sample of the user obtained in substantially real time ("live"), or contemporaneous with obtaining an image of the user's credential document. In some embodiments, biometric samples may include facial images, including facial images obtained from photo identifications, as well as self-photographs or "selfies" of the user obtained substantially concurrently, or contemporaneously, with a facial image obtained from the photo identification. Likewise, in some embodiments, biometric samples may include fingerprint samples as well as a variety of other user biometric modalities that can be used for authentication purposes, such as one or more iris samples. In some cases, one or more additional copies of a user's biometric sample(s) may be securely stored on a client device and/or on a backend authentication system as well.

In operation, the one or more biometric samples are compared to confirm or disconfirm the person presenting the user credential and real time biometric sample are the same person. In other words, the one or more biometric samples described herein may be variously compared to authenticate the user. Likewise, in at least some embodiments, the credential data extracted or captured from the user credential presented by the user may be compared to stored credential data to confirm that the data extracted or captured from the user credential is valid, current, accurate, correct, and the like. In other words, the credential data may be validated, in addition to the authentication steps described herein.

Accordingly, in the example embodiment, a live biometric sample may be obtained at the same that an image of a user credential is obtained. For example, the system may capture the live biometric sample (e.g., a facial image, a fingerprint sample, an iris sample, etc.) and the image of the user credential at the same time and within a single image or snapshot. In some embodiments, the live biometric sample and the image of the user credential may also be captured substantially simultaneously, such as in a real-time sequence of image or video frames. As a result, the system is capable of performing the authentication and validation processes, as described herein, in response to the substantially simultaneous presentation and image capture of both of a live biometric sample and user credential. Stated another way, in at least some implementations, the system may require substantially simultaneous presentation of both of the live biometric sample and user credential to facilitate improved security of the authentication and validation processes. However, in at least some embodiments, the system may also permit staggered presentation of the live biometric sample and user credential (e.g., a delay of several seconds to several minutes), such as to give a user time to retrieve his or her credential from a wallet or pocket book, and the like.

Embodiments of the systems and methods described herein provide many benefits such as, for example, but not limited to the following: (a) validation of user credential data presented by a user in the form of a physical and/or digital identification; (b) secure storage of credential data on a backend validation system and/or locally, such as by a client device; (c) validation of user credential data presented by a user against the stored credential data on either of the backend validation system and/or locally by a client device; (d) authentication of a user based upon a variety of biometric data, such as facial image data, fingerprint data, and the like; (e) secure storage of biometric data on a backend authentication system and/or locally, such as by a client device; (f) authentication of the user by either of the backend authentication system and/or locally by a client device; (g) substantially real-time and/or concurrent authentication and validation of the user as well as the user credential presented by the user; (h) authentication and validation in a variety of circumstances, such as various law enforcement and other security settings, to facilitate online payment transactions and/or point of sale transactions, and the like; and (i) authentication and validation of both physical forms of identification and other transaction instruments as well as digital forms thereof, such as digital identifications, digital driver's licenses, passports, and the like.

As used herein, the term "user credential" may include any physical or digital form of credential document, identification, or other documentation associated with a user that may be used to identify the user. For example, in at least some embodiments, user credentials may include any form of photo identification (photo ID), such as a driver's license or other government or non-government issued photo ID. Likewise, in some embodiments, user credentials may include transaction instruments, such as payment cards (e.g., credit and debit cards). In some embodiments, user credentials are digital and may include digital wallet data and/or any other information stored on a memory device that can be used to identify a user. Accordingly, user credentials may include, as described variously herein, both physical forms of identification, payment, and the like, as well as digital forms of the same.

As used herein, the term "validation" means confirming information contained or included in a user credential is valid. In some embodiments, validation may thus include confirming such information is accurate and current, or "up to date." Likewise, in at least some embodiments, validation may also include confirming information included in a user credential is not fraudulent and/or matches information contained in a secure storage system, or system of record, such as a secure backend system that maintains user credentials for a plurality of users (e.g., a motor vehicles department system, a law enforcement system, a payment processor system, and the like).

As used herein, "authentication" means confirming a user presenting a user credential is the real, or "authentic," owner of the user credential; or confirming a credential document itself is a real, or "authentic," document originating from an issuing authority such as a federal or state government, or agency thereof. For example, authentication may include comparing a photograph or facial image of the user obtained from a biometric measurement device, such as a camera, to a photograph or facial image of the user contained in the system of record. Likewise, authentication may include comparing a fingerprint sample of the user obtained from a biometric measurement device, such as a camera and/or a fingerprint scanner, to a fingerprint sample contained in the system of record. Similarly, in some embodiments, authentication of a credential document may include validating elements of credential data against a system of record.

Accordingly, as described in additional detail herein, validation and/or authentication steps may be implemented in combination to confirm, not only that a user credential supplied by the user is in fact valid, but also that the user who has provided the user credential for validation is the real, or authentic, owner of the credential and that the user credential has therefore not been obtained and/or fraudulently provided by a person who is not the real or authentic subject, or owner, of the credential.

FIG. 1 is a block diagram illustrating an example embodiment of a system 100 for biometrically authenticating and validating a user based on a user credential. In the example embodiment, system 100 includes a client device 102, a credential validation system 104, an authentication system 106, and/or an issuing authority system 108. As described herein, system 100 may, in various implementations, include, at least in part, any of a variety of systems and/or devices arranged to measure and/or receive biometric information of a user and/or one or more documents of a user, such as any government system (e.g., airport security systems, motor vehicles department systems, etc.) as well as any non-government system, such as a payment processor system (e.g., a banking system), and the like.

Accordingly, in the example embodiment, client device 102 may be any device that captures a biometric sample, such as one or more facial images and/or one or more fingerprint samples (e.g., fingerprint images and/or fingerprint scans). In some embodiments, client device 102 may be a computing device, such as a personal computing device, a smartphone, a tablet, and the like. Likewise, in some embodiments, client device 102 may be any other computing device that captures one or more biometric samples, such as an image capture device and/or fingerprint scanner in an airport, at a motor vehicles department, and the like.

In at least some implementations, client device 102 may include a biometric measurement device 110, a communication interface 112, and/or a user interface 114. As described herein, biometric measurement device 110 may be any device that collects a biometric sample, such as an image of the user, a fingerprint sample of the user, and the like. Thus, biometric measurement device 110 may be a camera and/or an array or group of cameras (e.g., for three-dimensional facial imaging, iris detection and/or imaging an iris of the human eye), a fingerprint scanner, a microphone (e.g., for heartbeat measurement), and/or any other suitable device. Likewise, in various embodiments, client device 102 may include a processor 109 and/or a memory device 111. As described herein, processor 109 may execute instructions stored on memory device 111 to implement one or more processes, or portions of processes, for validation and/or authentication, as described herein.

Moreover, in at least some embodiments, client device 102 may also include an image capture device 120, such as one or more cameras, which may as described herein, capture a biometric sample of a user and an image of a user credential 300 and/or 400. For example, as described herein, image capture device 120 may capture the image of biometric sample, such as a facial image and/or fingerprint sample, substantially contemporaneously with capturing an image of the user credential 300 and/or 400, such as in a single image or frame, and/or in a series or sequence of images or frames obtained within a short period of time (e.g., milliseconds, seconds, and the like). As used herein, the terms "contemporaneously" and "substantially contemporaneously" may thus refer to capture of the biometric sample and image of the user credential 300 and/or 400 in a single image or sequence of images. Likewise, in some uses, the terms may refer to capture or receipt of the biometric sample and image of the user credential 300 and/or 400 within a predefined period of time, such as within less than 5 milliseconds, less than 1 second, less than 10 seconds, less than 30 seconds, less than 60 seconds, less than 1 minute, less than 5 minutes, and/or any other desired period of time. In addition, in some embodiments, client device 102 may also store a user's credential sample 122. Specifically, in at least some embodiments, client device 102 may store a user's credential sample 122 (e.g., to memory device 111 and/or another memory device) following image capture of the user credential 300 and/or 400. In some embodiments, the credential sample 122 may be a digital identification document. Examples of electronic proof of identity may include a digital identification document, such as, for example, a digital driver's license, a digital passport, a digital social security card, a digital medicare/Medicaid card, etc.

The credential sample 122 may be compared against an identity database, or system of record, during a validation, or identity "proofing," process. In general, the identity proof may become available only after a vetting process at an authoritative institution, such as the department of motor vehicles (DMV), the state department, etc. The vetting process may additionally comply with legislative directives, such as the REAL ID Act or the PASS ID Act, to boost secure identity documentation. The identity proof indicates the credential sample 122 is validated. As a result, possession of the validated credential sample 122 establishes a prima facie showing the holder is the person identified by the electronic proof of identity. Validation, or proofing, of the credential sample 122 may be required for the first instance of a particular type of transaction, after a certain time period, or after a certain number of transactions. The identity proof allows for transactions to occur without vetting the user and the credential sample 122 for each transaction, and maintains a level of security in the transactions.

Communication interface 112 may be any wired and/or wireless communication interface that facilitates communication between client device 102 and any of systems 104-108 over network 103, where network 103 may include a wide-area-network, a local-area-network, the internet, and/or any other collection of networked computing devices. In some embodiments, communication interface 112 may also facilitate wireless communications using any of a variety of wireless protocols, such as WiFi, Bluetooth, cellular, NFC, and/or other protocol(s) in the radio frequency (RF) spectrum.

User interface 114 may be a touchscreen user interface, such as a capacitive touchscreen interface. In some embodiments, user interface 114 may include other user input and/or output peripheral devices, such as a keyboard, a mouse, a scanner, and the like. In some embodiments, user interface 114 may include a display device, such as a liquid crystal display (LCD), a light emitting diode (LED) display, an organic light emitting diode (OLED) display, a plasma display, an electroluminescent display, a quantum dot display, and the like.

In some embodiments, credential validation system 104 may be a server system that stores user credential data 105, such as driver's license data, other photo identification data and/or identification data, payment card data, and/or any other personally identifiable information (PII) that may be used to validate a user credential presented to system 100 by a user, as described in additional detail below. Credential data 105 and other PII may be encrypted using any suitable encryption protocol or encryption algorithm to ensure the security of these data. Moreover, in various embodiments, credential validation system 104 may include a processor 113 and/or a memory device 115. As described herein, processor 113 may execute instructions stored on memory device 115 to implement one or more processes, or portions of processes, for validation and/or authentication, as described herein. In some embodiments, credential validation system 104 may also communicate, such as via network 103, with issuing authority system 108 to obtain credential data 105. More particularly, issuing authority system 108 may be a government and/or non-government system that securely stores and/or warehouses any of a variety of credential data 105. In one example, issuing authority system 108 may be a motor vehicles department database. Likewise, in another example, issuing authority system 108 may be an airport security system (e.g., a transportation security authority system), and/or any other system responsible for maintaining credential data 105, PII, and the like.

Credential data 105 stored in credential validation system 104 may be acquired after a vetting process. The vetting process for a government entity may include a lengthy application process to verify an applicant's identity. For example, when applying for a driver's license, a state DMV typically require the applicant to present a valid driver's license from another jurisdiction, or a valid passport, or a valid permanent resident card. The applicant may be further required to provide proof of residence, including utility bills, cable bills, phone bills, etc. to show that the applicant indeed resides in the intended jurisdiction. Sometimes, the applicant may need to provide proof of employment as well. The applicant may be additionally required to pass vision test or a driving test. Once the applicant has passed the tests, biometric information identifying the applicant may be taken from the applicant, including, for example, a portrait of the applicant, a fingerprint of the applicant, a signature of the applicant, etc. Other personally identifiable information, such as hair color, eye color, blood type, birth date, etc., may also be collected from the applicant. The vetting process may include authenticating the applicant and performing background check on the applicant. Successful completion of the vetting process may establish a prima facie presumption of the applicant's identity as recorded in the identity database.

As to the non-government entities housing identity databases, a comparable vetting process may be instituted to establish a prima facie presumption of the member's identity. For example, profession organizations may require applicant to complete a thorough screening process before the applicant can be admitted as a member. Additionally, annual membership dues and compliance with professional conduct may be required to maintain membership. The screening process, along with membership obligations, may filter out unqualified individuals or members not in good standing. In doing so, the trustworthiness quality of the identity data of the active members may be maintained.

A request to validate may be submitted to the credential validation system 104. The request may include credential sample 122 which may be obtained from client device 102. Credential validation system 104 may compare credential sample 122 with credential data 105 to validate the credential sample 122. Credential validation system 104 may submit a query to issuing authority system 108 in an effort to compare the identity information of the user against issuing authority system 108. Credential validation system 104 may compute an authenticity score indicating the relative authenticity of the identity information of the user. Generally, the authenticity score may amount to a matter of degree of confidence as to the authenticity of a purported identity. The requisite authenticity score may vary, depending on the application underneath. In other words, the authenticity score may numerically attest to the identity of the user. Query results may be received from issuing authority system 108. In some implementations, a 1 to 1 mapping result may be returned from the issuing authority system 108 in response to the query.

Authentication system 106 may be any system that facilitates authentication of a user, as described herein, such as any server system, any database system, any combination of database systems and server systems, and the like. In at least some implementations, authentication system 106 includes a database that stores biometric sample data 107, such as one or more facial images of a user, one or more fingerprint samples of the user, and/or any other biometric sample data 107, such as but not limited to, images of a user's iris, heartbeat data, genetic information, and the like. The biometric sample data 107 stored by authentication system 106 may be encrypted using any suitable encryption algorithm to ensure the security of the data. Moreover, in various embodiments, authentication system 106 may include a processor 117 and/or a memory device 119. As described herein, processor 117 may execute instructions stored on memory device 119 to implement one or more processes, or portions of processes, for validation and/or authentication, as described herein.

Similar to the description above, a request to authenticate may be submitted to the authentication system 106. The request may include data obtained from biometric measurement device 110. Authentication system 106 may compare data obtained from biometric measurement device 110 with biometric sample data 107 to authenticate the user.

Figure 2:
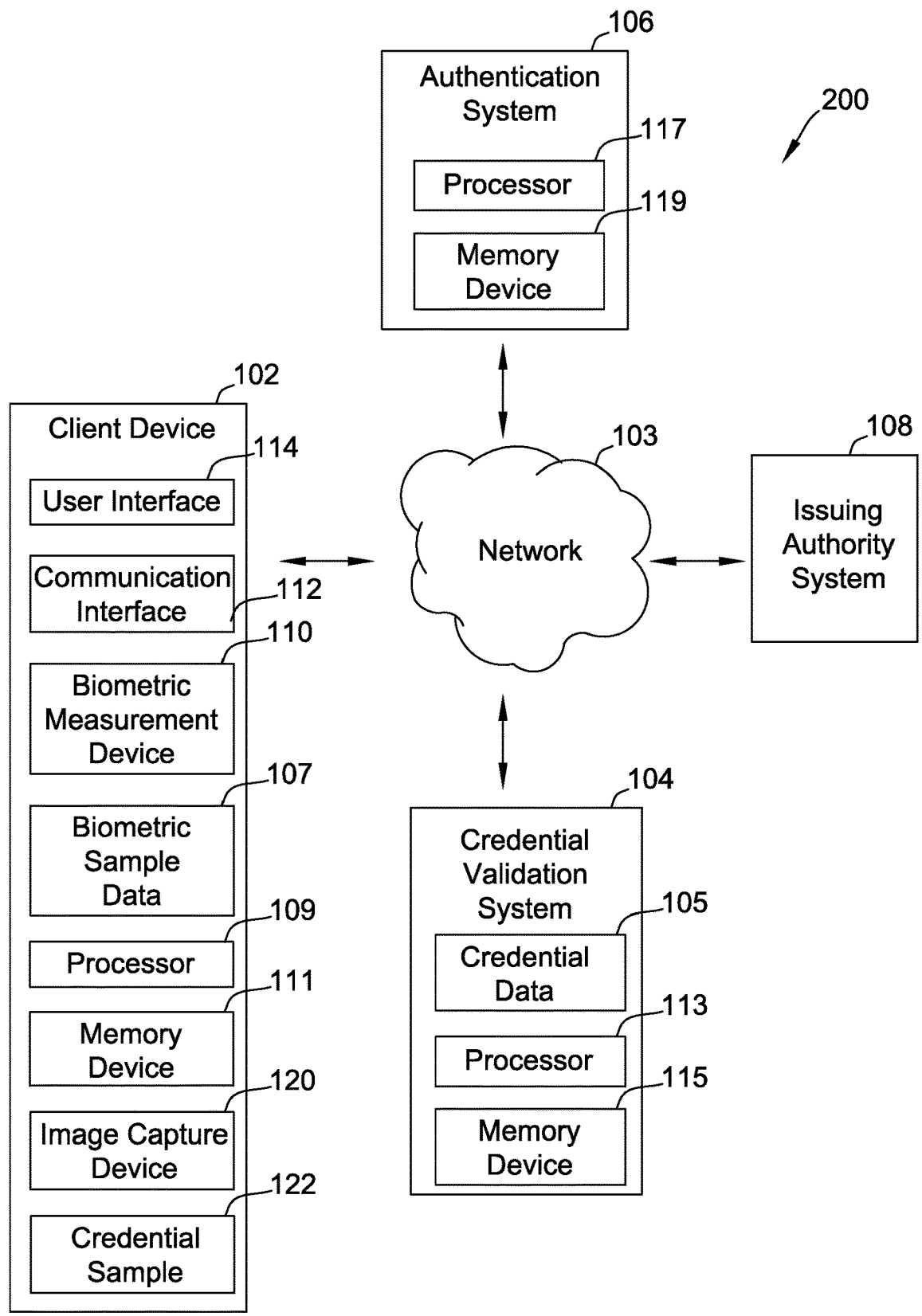
FIG. 2 is a block diagram illustrating an example embodiment of another system for authentication and validation based on user credential and biometric data.

FIG. 2 is a block diagram illustrating an example embodiment of another system 200 for biometrically authenticating and validating a user based on a user credential. System 200 is similar to system 100, except that system 200 may maintain at least some of the biometric sample data 107 on client device 102 rather than, and/or in addition to, storage of biometric sample data 107 on authentication system 106. In at least one embodiment, storage of biometric sample data 107 on client device 102 may facilitate rapid authentication of a user without requesting biometric sample data 107 via network 103 from authentication system 106. In one example, a rapid comparison of a scanned or image captured facial image to a facial image sample in the biometric sample data 107 and/or a rapid comparison of a scanned or image captured fingerprint sample to a fingerprint sample in the biometric sample data 107 may be accomplished when biometric data 110 is stored locally on client device 102. As a result, computer processing requirements and/or processing times may be reduced.

Another example advantage of storing at least some biometric sample data 107 on client device 102 is that a user may be authenticated when network 103 is unavailable and/or when network connectivity is otherwise sporadic. Yet another example advantage of storing biometric sample data 107 on client device 102 is that the security of a user's biometric sample data 107 may be improved. For example, storage of biometric sample data 107 only on client device 102 (e.g., and not on authentication system 106) may prevent hacking attempts against the biometric sample data 107, particularly where the biometric sample data 107 is encrypted on client device 102. Likewise, if client device 102 is a user device, such as a smartphone or another personal computing device, the security of biometric sample data 107 may be further improved by the encrypted storage of biometric sample data 107 only on the user's personal device. In at least some embodiments, biometric sample data 107 may, additionally or alternatively, be securely stored in the cloud (e.g., by authentication system 106) in encrypted form, behind one or more network firewalls, and the like.

Figure 3:
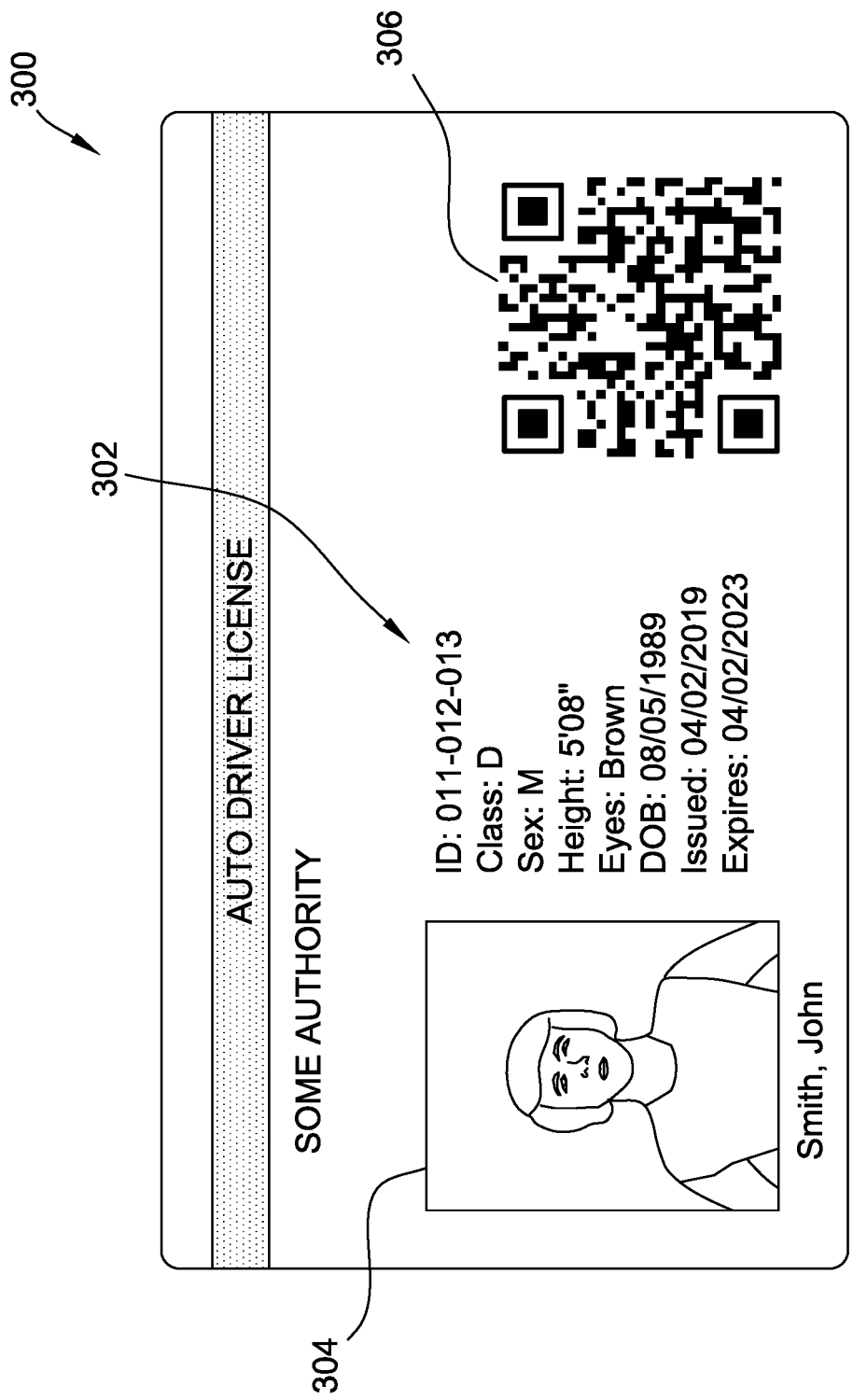
FIG. 3 is a front view of an example embodiment of a user credential that may be used with the systems shown in FIGS. 1 and 2.

FIG. 3 is a front view of a user credential 300 that may be used with the systems 100 and/or 200, as shown in FIGS. 1 and 2. In the example embodiment, user credential 300 may be any government issued and/or non-government issued form of identification, such as for example, but without limitation, an automobile driver license issued by a motor vehicles department and/or another state or federal agency, a corporate identification issued by an employer of the user, a payment card issued by a payment authority, such as a bank or other financial institution, and the like.

In at least some implementations, user credential 300 may include a variety of credential data 302, such as for example, personally identifiable information associated with the user (e.g., name, address, etc.) as well as any other information that may be desired. User credential 300 may also include biometric sample data, such as for example, a facial image 304 of the user. It will be appreciated that facial image 304 may be obtained and/or printed on user credential 300 when user credential 300 is issued to the user, as well as that user credential 300 may include an expiration date, after which the user may be required to provide an updated facial image 304.

In addition to these features, in at least one embodiment, user credential 300 may also include one or more encoded regions, such as an encoded region 306, which may encode any of the credential data 302. In one implementation, at least some credential data 302 is not printed on user credential 300 in an unencoded format. Rather, at least some of credential data may only be included on user credential 300 in encoded form within encoded region 306.

In another embodiment, however, all of the information contained in encoded region 306 may also be printed in an unencoded format on user credential 300 for convenient visual inspection. In addition, in at least one embodiment, one or more portions or data points associated with facial image 304 may also be encoded in encoded region 306 to provide an encoded representation of facial image 306. As described in additional detail herein, the data contained in encoded region 306 may be acquired by systems 100 and/or 200 for validation and/or authentication of the user and/or user credential 300.

Encoded region 306 may implement any suitable encoding format. For example, encoded region 306 may include a quick response (QR) code, a bar code, and/or any other visual, audio, and/or audio-visual encoding (e.g., when user credential 300 is presented in digital form, such as by a user device or smartphone). In another implementation, an encoded region 306 may encircle facial image 304, and more generally, any of a variety of encoding mechanisms and formats are contemplated by and within the scope of the present disclosure.

Figure 4:
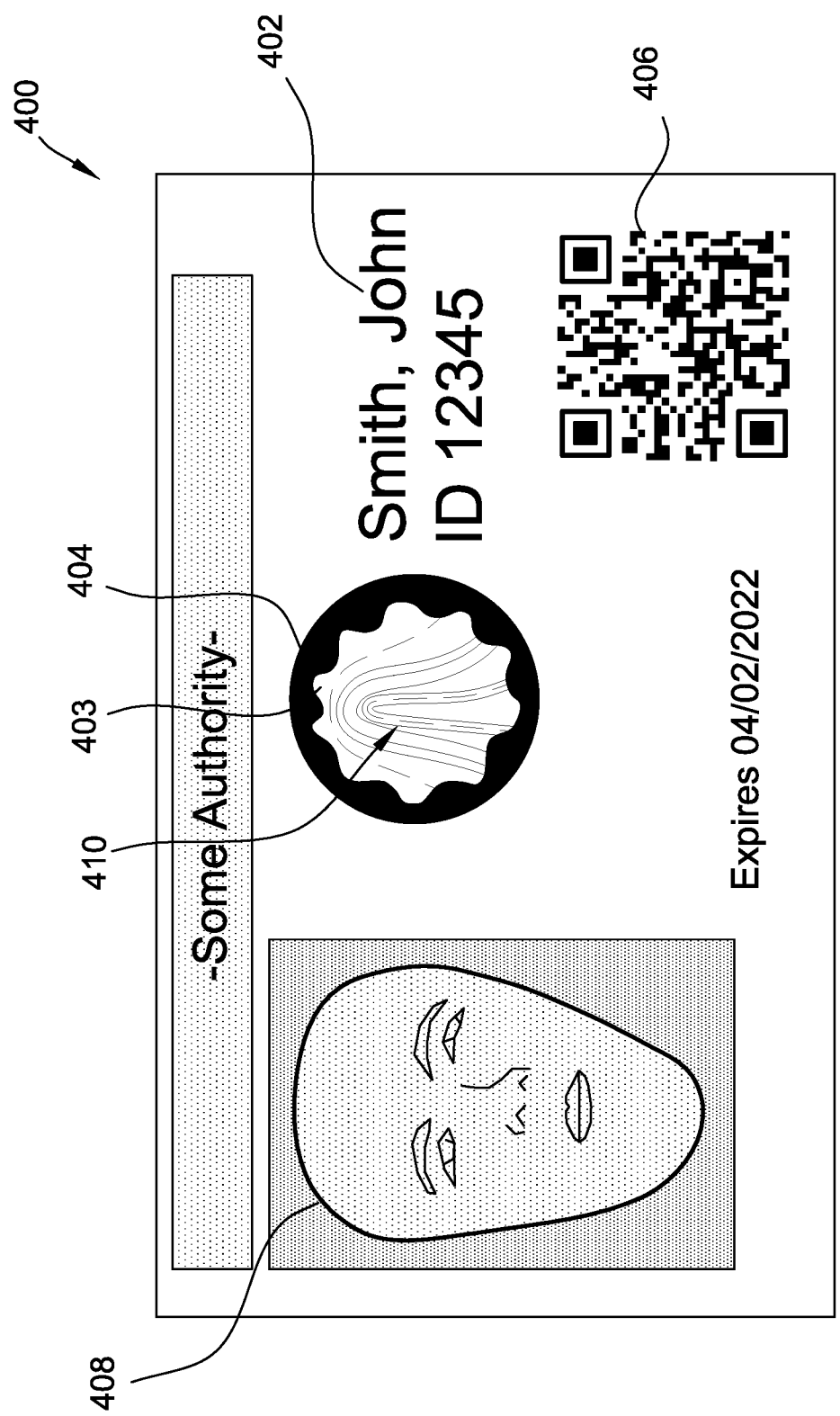
FIG. 4 is a front view of another example embodiment of a user credential that may be used with the systems shown in FIGS. 1 and 2, in which the user credential includes a biometric window.

FIG. 4 is a front view of another example embodiment of a user credential 400 that may be used with the systems 100 and/or 200, as shown in FIGS. 1 and 2. In the illustrated example, user credential 400 may, like user credential 300, include any of a variety of credential data 402, such as personally identifiable information, and the like. In the example embodiment, user credential 400 may also include a facial image 408 of the user. It will be appreciated that facial image 408 may be obtained and/or printed on user credential 400 when user credential 400 is issued to the user, as well as that user credential 400 may include an expiration date, after which the user may be required to provide an updated facial image 408.

In addition, user credential 400 may include a biometric window 404. In the example embodiment, biometric window 404 may include an opening or aperture 403 covered by a transparent material, such as a transparent and/or opaque plastic, which may be shaped to receive placement of a finger of the user thereon, and through which details of the user's fingerprint may be visible (e.g., in the illustrated example, fingerprint 410), optically readable or optically scannable, photographable, imageable, and the like. In some embodiments, biometric window 404 may be free of any material (e.g., biometric window 404 may be a simple cutout), that facilitates positioning and placement of the user's finger of fingertip through window 404.

Accordingly, as described in additional detail herein, the user may lay user credential 400 down on an optical scanning device (e.g., client device 102), within the user's finger pressed against one side of biometric window 404. Client device 102 may capture one or more images of user credential 400, including any information printed on user credential 400. Likewise, client device 102 may capture one or more images and/or otherwise obtain a sample measurement (e.g., using biometric measurement device 110) of the user's fingerprint through biometric window 404. In some embodiments, it may not be necessary to lay user credential 400 against an optical scanning device. Rather, client device 102 may image the user's fingerprint through window 404 using one or more image capture devices, such as one or more cameras.

In at least one embodiment, user credential 400 may also include one or more encoded regions, such as an encoded region 406, that may encode any of the credential data 402. In one implementation, at least some credential data 402 is not printed on user credential 400 in an unencoded format. Rather, at least some of credential data may only be included on user credential 400 in encoded form within encoded region 406. In addition, in at least one embodiment, one or more portions or data points associated with a fingerprint sample of the user (e.g., which may also be stored on client device 102 and/or by authentication system 106, as described herein) may also be encoded in encoded region 406 to provide an encoded representation of a pre-stored or previously obtained copy of user's fingerprint sample. As described in additional detail herein, the data contained in encoded region 406 may be acquired by systems 100 and/or 200 for validation and/or authentication of the user and/or user credential 400.

More generally, encoded region 406 may implement any suitable encoding format. For example, encoded region 406 may include a quick response (QR) code, a bar code, and/or any other visual, audio, and/or audio-visual encoding. In another implementation (not shown), an encoded region 406 may encircle biometric window 404, such as in the form of a boundary pattern, and more generally, any of a variety of encoding mechanisms and formats are contemplated by and within the scope of the present disclosure. In one embodiment, an encoded region 406 containing one or more aspects of a fingerprint sample and or any of a variety of personally identifiable information encircles, at least partially, biometric window 404. For example, in one example, an undulating boundary pattern may at least partially encircle biometric window 404. The boundary pattern may encode a date of birth, an identification number, and/or any other information as desired.

Although physical forms of user credentials 300 and/or 400 are generally described herein, in at least some implementations, user credentials 300 and/or 400 may be stored as digital forms of identification, such as by client device 102 and/or another user device, such as a smartphone of the user. For example, client device 102 may securely store user credentials 300 and/or 400 on a memory device thereof (e.g., in an encrypted format). Client device 102 may also display user credentials 300 and/or 400, or portions of user credentials 300 and/or 400, on a display device thereof, which may facilitate providing user credentials 300 and/or 400 for visual inspection by a law enforcement and/or security officer. In some embodiments, user credentials 300 and/or 400 may be displayed by a user device, such as a smartphone, and imaged by client device 102 in the same way that physical forms of user credentials 300 and/or 400 may be imaged as described herein. In some embodiments, a user device may wirelessly transfer all or a portion of the data included in user credentials 300 and/or 400 to client device 102 for added convenience and/or security (e.g., such that client device 102 does not need to acquire any image data of user credentials 300 and/or 400). Accordingly, many options for providing user credentials 300 and/or 400, and the data associated therewith, are contemplated by the present disclosure, including image capture and optical scanning options, as well as wireless data transfer options.

Figure 5:
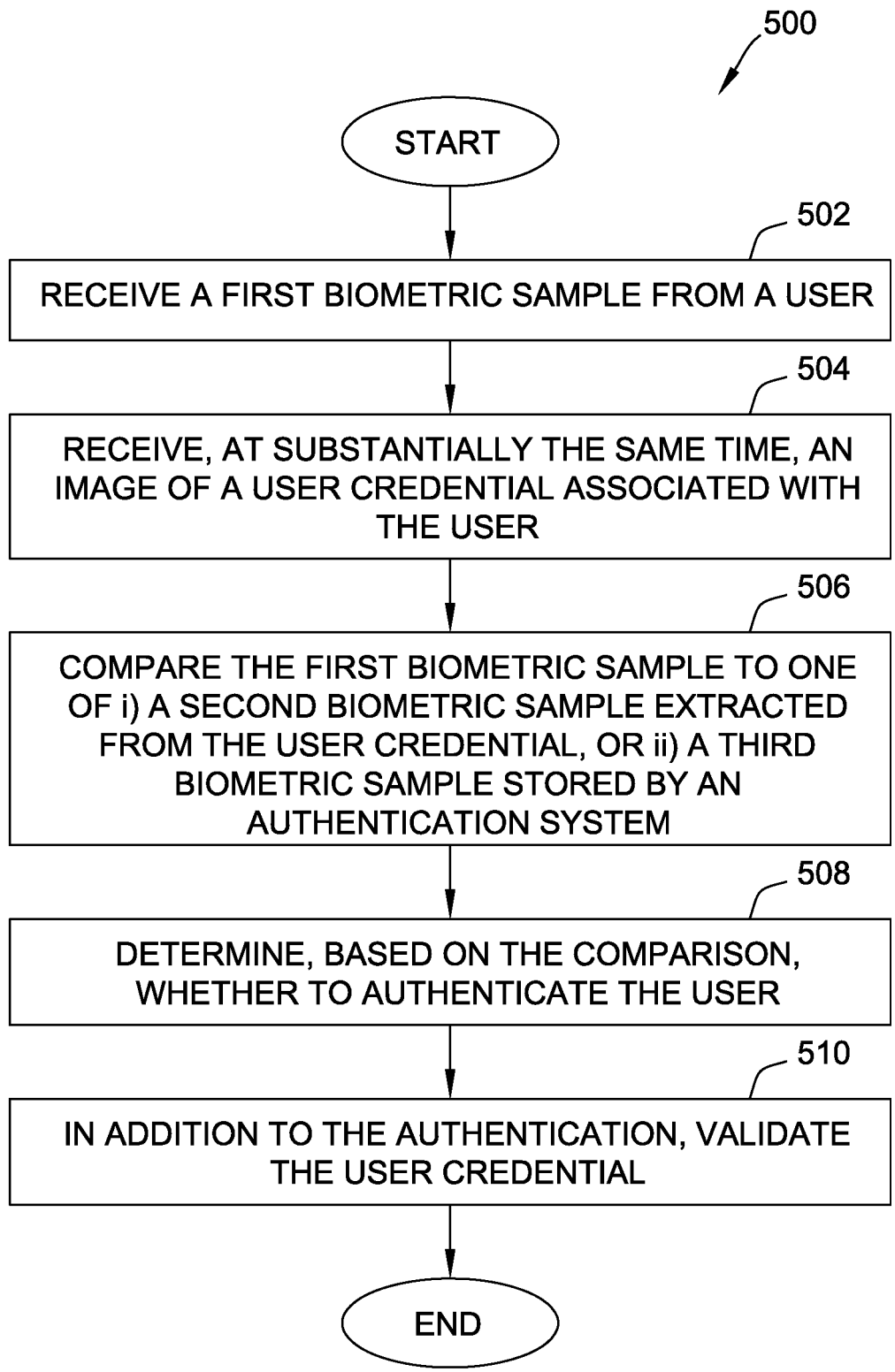
FIG. 5 is a flowchart illustrating an example embodiment of a process for authentication and validation based on user credential and biometric data using the systems shown in FIGS. 1 and 2.

FIG. 5 is a flowchart illustrating an example embodiment of a process 500 for biometrically authenticating and validating a user based on a user credential 300 and/or 400, using the systems 100 and/or 200. In the example embodiment, client device 102 may receive a first biometric sample from a user, such as one or more facial image samples of the user, one or more fingerprint image samples of the user, an iris sample of the user, and/or any other suitable biometric sample (step 502).

The first biometric sample may be collected from the user substantially in real-time (e.g., a "live" biometric sample), such as, for example, in response to the user requesting access to a secure area (e.g., in an airport). Likewise, the first biometric sample may be provided by the user to a law enforcement or security officer substantially in real-time in response to a request for the first biometric sample by the officer (e.g., during a routine traffic stop). In addition, as described herein, the first biometric sample may be provided by the user substantially in real-time to initiate a purchase or payment transaction, such as a payment transaction conducted via the user's smartphone and/or other personal computing device (e.g., via client device 102) for goods and/or services purchased by the user via an online or internet storefront, and the like.

At roughly the same time, or substantially concurrently or substantially contemporaneously, with receiving the first biometric sample, client device 102, in at least some embodiments, also receives an image of the user credential 300 and/or 400 associated with and carried by the user (step 504). For example, in at least one example implementation, the image of the user credential 300 and/or 400 may, as described herein, be captured at the same time as the first biometric sample is captured, such as in a single image (or sequence of images) obtained by client device 102, thereby proving both the liveness of the biometric sample and possession of the user credential 300 or 400 by the individual from whom the biometric sample is taken, i.e., the user. Stated another way, the first biometric sample (e.g., the facial image) and the user credential 300 and/or 400 may be simultaneously presented by the user for image capture by client device 102 (e.g., held up within a field of view of a camera of client device 102, as shown and described in additional detail below with reference to FIGS. 6-8). A longer duration between capturing the biometric sample and image capture of the user credential 300 and/or 400 erodes confidence in both the liveness of the biometric sample and the authenticity of the presentation of the user credential 300 or 400, i.e., that the user is the owner of the user credential 300 and/or 400.

Client device 102 may thus scan or photograph user credential 300 and/or 400 to obtain the image of user credential 300 and/or 400, such as in combination with taking a photograph of the user's facial image and/or obtaining a fingerprint image sample 410, in at least one embodiment. Accordingly, client device 102 receives an image of the entire user credential 300 and/or 400 and performs image processing to extract credential data 302 and/or 402 and a second biometric sample, such as facial image 304 and/or, in some embodiments, an encoded fingerprint image sample (e.g., such as a fingerprint sample encoded in region 406). In at least one implementation, client device 102 may scan and/or decode encoded region 306 and/or encoded region 406 to obtain credential data 302 and/or 402, and/or any other digital representation of biometric sample data. Likewise, in at least some implementations, client device 102 may receive at least a portion of the foregoing data wirelessly from a user device (e.g., a smartphone of the user), such as in an embodiment that substitutes a digital form of user credentials 300 and/or 400 for physical forms of identification.

In the example embodiment, systems 100 and/or 200 may, in response to receiving at least some of user credential data 302 and/or 402 (e.g., by scanning user credentials 300 and/or 400) and/or one or more contemporaneously received biometric samples, compare the received first biometric sample to the second biometric sample obtained by imaging user credential 300 and/or 400 (step 506). More particularly, in at least one implementation, client device 102 and/or authentication system 106 may compare the received first biometric sample (e.g., the real-time facial image and/or fingerprint sample) of the user to the second biometric sample (e.g., the imaged biometric sample obtained from user credential 300 and/or 400). If the first biometric sample and the second biometric sample match, the user may be authenticated, as described herein, to confirm that the user presenting user credential 300 and/or 400 is the authentic or real owner of the credential 300 and/or 400 (step 508).

In at least one implementation, an authentication outcome may be generated by system 100 and/or 200 to provide an indication whether the user authentication was successful, as described above, and in at least some embodiments the authentication outcome may be transmitted to a third party system, such as a government and/or non-government system. For example, the authentication outcome may be provided to an airport security system to facilitate a determination whether to allow the user entry into a secure area (e.g., a terminal area). Likewise, in a payment processing embodiment, the authentication outcome may be provided to a payment processor to facilitate approval and/or denial of a payment authorization request submitted by the user (e.g., when the user is shopping online for goods and services, etc.) In some embodiments, a fraud alert may also be generated and/or transmitted to a third party system in response to an authentication outcome that suggests or indicates that the person providing the user credential 300 and/or 400 is not the authentic owner of the credential.

As described above, client device 102 may in some embodiments perform the user authentication locally to enhance processing speed as well as to provide an authentication option that does not rely on connectivity to network 103. In another embodiment, authentication system 106 may compare the received first biometric sample to a third biometric sample stored by authentication system in biometric sample data 107 to facilitate the authentication processing on a backend portion of system 100, which may be beneficial as well, such as for validated storage of user biometric data in a cloud or other network location that cannot be hacked or tampered with by the user. In some embodiments, the credential data 302 and/or 402 obtained from user credential 300 and/or 400 may include information or data (e.g., personally identifiable information, such as a username, address, identification number, etc.) that can be used to retrieve the third biometric sample (e.g., as a primary key to a database of biometric samples 107) stored by authentication system 106.

In addition to authenticating the user, as described above, in the example embodiments, the user credential 300 and/or 400 presented by the user to client device 102 may also be validated to confirm that information contained or included in the user credential 300 and/or 400 is valid (step 510). For instance, system 100 and/or 200 may validate user a user credential 300 and/or 400 to confirm that credential data 302 and/or 402 is valid (e.g., accurate and up to date, etc.)

To perform the validation, in at least one embodiment, the credential data 302 and/or 402 obtained by client device may be compared to credential data 105 stored by credential validation system 104. Specifically, in some implementations, credential data 302 and/or 402 may be transmitted to credential validation system 104 for comparison, by at least one processor of system 104, against credential data 105 stored by system 104. Alternatively, or additionally, credential validation system 104 may transmit credential data 105 for a specific user to client device 102, and client device 102 may perform the comparison of credential data 302 and/or 402 against credential data 105 to determine whether the credential data 302 and/or 402 provided by the user is valid. Accordingly, as described herein, a variety of backend and local processing options are contemplated by and within the scope of the present disclosure.

In at least one implementation, a validation outcome may be generated by system 100 and/or 200 to provide an indication whether credential data 302 and/or 402 provided by the user is valid, as described above, and in at least some embodiments the validation outcome may be transmitted to a third party system, such as a government and/or non-government system. For example, the validation outcome may be provided to an airport security system to facilitate a determination whether to allow the user entry into a secured area (e.g., a terminal area). Likewise, in a payment processing embodiment, the validation outcome may be provided to a payment processor to facilitate approval and/or denial of a payment authorization request submitted by the user (e.g., when the user is shopping online for goods and services, etc.)

Figure 6:
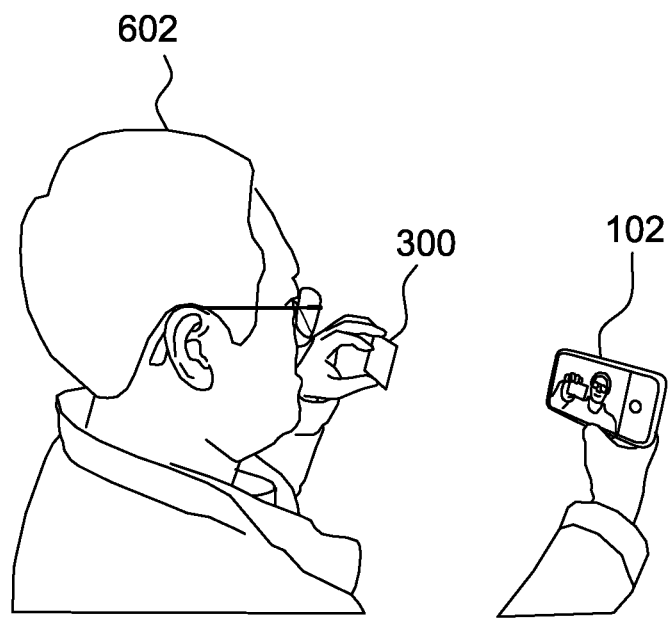
FIG. 6 is a perspective view of a first example embodiment of a user being biometrically authenticated based on facial imagery using the systems shown in FIGS. 1 and 2.

FIG. 6 is a perspective view of a first example embodiment of a user 602 being biometrically authenticated based on facial imagery using systems 100 and/or 200, as shown in FIGS. 1 and 2. Accordingly, in the example embodiment, user 602 presents a user credential, such as user credential 300, to client device 102, which in the present example is a smartphone of user 602. As shown, user 602 may present user credential 300 proximate the user's face to facilitate image capture of both user credential 300 as well as at last one facial image (e.g., at least one self-photograph or "selfie" of user 602). Specifically, user credential 300 and the user's facial image may be captured at substantially the same time (e.g., contemporaneously, as described herein).

In response to presentation of user credential 300, client device 102 may, as described herein, acquire at least one image of user credential 300. In addition, client device 102 may acquire, simultaneously or substantially at the same time, or contemporaneously, the live or real time facial image (e.g., the "selfie") of user 602. In some embodiments, user 602 may launch a software application (or smartphone "app") to initiate image capture processes as well.

As described in detail above, in response to receiving the image of user credential 300, client device 102 may extract a biometric sample image (e.g., the facial image 304) from user credential 300, such as using an image recognition and/or image processing algorithm. Likewise, client device 102 may extract and/or decode credential data 302 from user credential 300, including, in at least some embodiments, from encoded region 306. As a result, client device 102 may capture a first biometric sample facial image of user 602 from user credential 300 and a second biometric sample facial image (e.g., the "selfie") of user 602 positioned next to and/or nearby, as shown, user credential 300.

Moreover, as described above, user 602 may be authenticated by client device 102 and/or authentication system 106, such as based upon a comparison of the first biometric sample facial image obtained from user credential 300 to the second biometric sample facial image (or "selfie") obtained from an image capture of user 602. In some embodiments, one or both of the first and second biometric sample facial images may be compared to a third biometric sample facial image stored by authentication system 106 in biometric sample data 107.

In addition to authenticating user 602, the credential data 302 included on user credential 300 may also be acquired (e.g., decoded from encoded region 306 and/or simply image captured and processed from user credential 300 in plain language). As described herein the credential data 302 may be compared to stored credential data 105, such as by client device 102 on the system frontend and/or by another backend system, such as credential validation system 104, to validate the credential data 302 obtained from user credential 300.

As a result, user 602 may present user credential 300 in association with a self-photograph obtained contemporaneously with presentation of user credential 300 to validate user credential 300 as well as to authenticate user 602 to system 100 and/or 200. Moreover, although not shown, it will be appreciated that a substantially similar process may be used to process user credential 400, except that instead of authenticating user 602 based upon facial image data, system 100 and/or 200 may authenticate user 602 based upon another biometric parameter, such as based upon fingerprint sample data, iris and/or other biometric data associated with the human eye, and/or any other suitable biometric parameter that can be measured and authenticated, as described.

Figure 7:
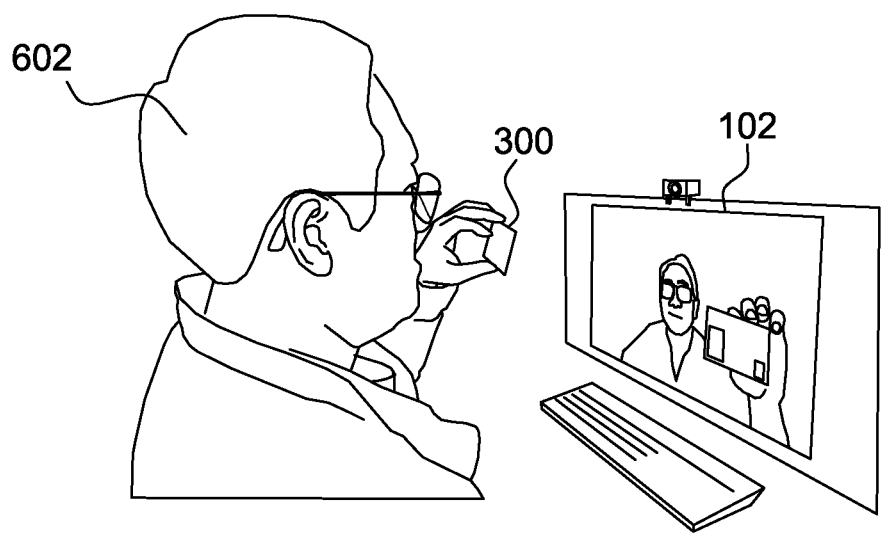
FIG. 7 is a perspective view of a second example embodiment of a user being biometrically authenticated based on facial imagery using the systems shown in FIGS. 1 and 2.

FIG. 7 is a perspective view of a second example embodiment of user 602 being biometrically authenticated based on facial imagery using systems 100 and/or 200, as shown in FIGS. 1 and 2. Specifically, user 602 presents a user credential, such as user credential 300, to client device 102, which in the present example is a personal computing device of user 602 (e.g., as opposed to the smartphone of FIG. 6). Apart from this difference, however, in at least some embodiments, the process for authenticating and validating user 602 is otherwise the same as described above with reference to FIG. 6 and is not therefore described in additional detail herein.

Figure 8:
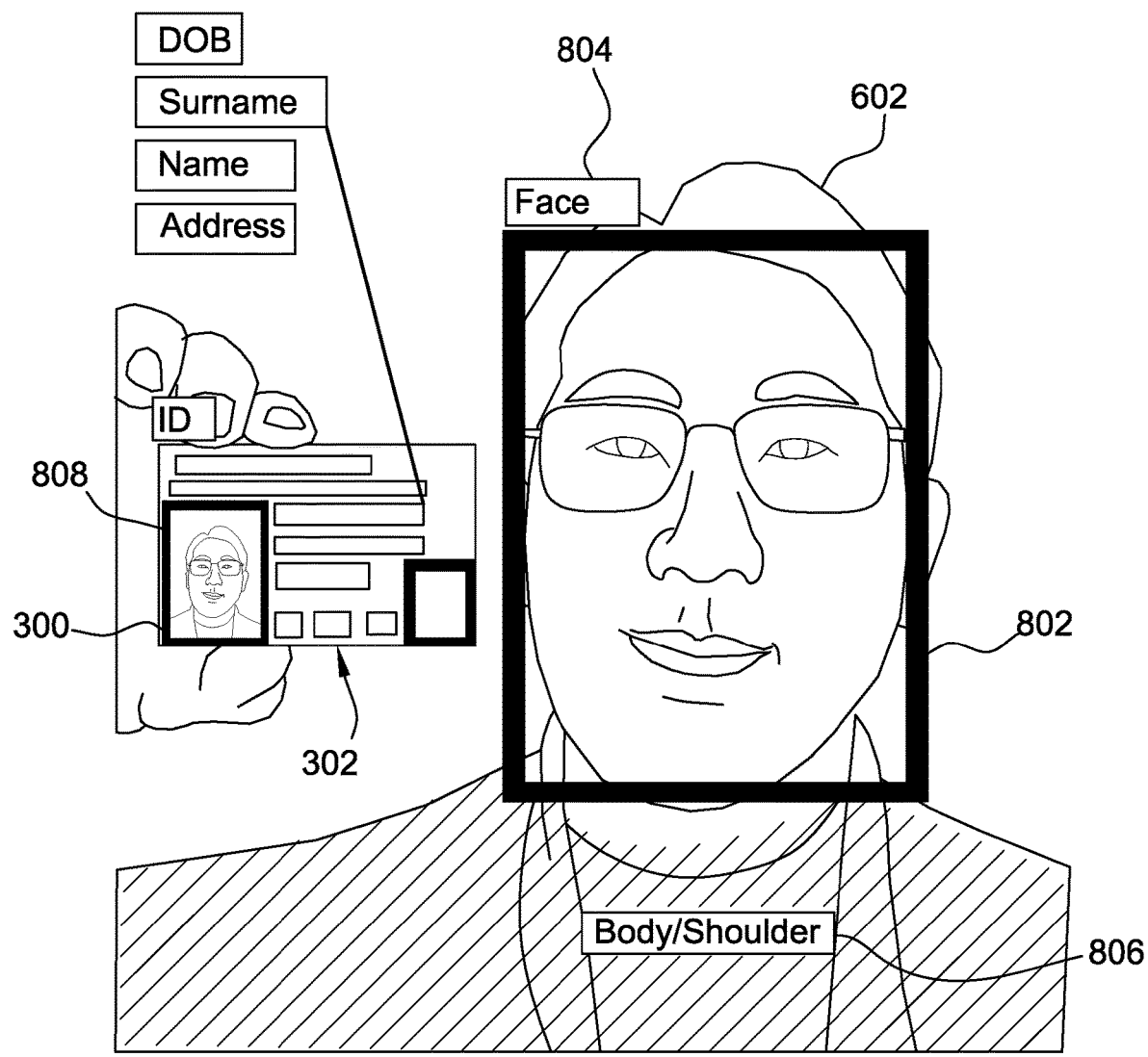
FIG. 8 is a front view of image processing being performed on a user credential using the systems shown in FIGS. 1 and 2.

FIG. 8 is a front view of image processing being performed on a user credential 300 and/or 400 using systems 100 and/or 200, as shown in FIGS. 1 and 2. For example, as described above, client device 102 may obtain one or more images of user credential 300 and/or a self-photograph 802 of user 602 when user 602 positions user credential 300 proximate (e.g., within a camera angle of) the face of user 602, as shown. Client device 102 may, in at least some embodiments, perform one or more image processing operations to separate and/or otherwise identify the self-photograph 802 from the image of user credential 300, as shown.

For example, client device 102 may identify a facial region 804 and/or a body region 806 of self-photograph 802 using one or more image processing and/or machine learning algorithms. Likewise, client device 102 may identify a facial image 808 of user 602 printed on user credential 300 as well as credential data 302 using one or more image processing and/or machine learning techniques. Client device 102 may, in addition, perform a variety of other image recognition and data processing operations, as described herein, such as decoding an encoded region 306, processing fingerprint data and/or other biometric sample data, and the like.

Embodiments of the systems and methods described herein thus facilitate authentication and/or validation of a user based on user credential and/or biometric data. For example, in some embodiments, a user credential, such as a photo identification, may be presented by a user and an image thereof captured to obtain a biometric sample of the user provided on the user credential. Other credential data, such as any of a variety of personally identifiable information or "PII," may also be provided on the user credential and captured or scanned as well. In some cases, the credential data may also be encoded on the user credential, such as in the form of a quick response (QR) code, and/or any of a variety of other suitable encoded formats.

In addition to obtaining the biometric sample and/or credential data, the systems described herein may obtain another biometric sample, such as biometric sample of the user obtained in substantially real time. In some embodiments, biometric samples may include facial images, including facial images obtained from photo identifications, as well as self-photographs or "selfies" of the user obtained substantially concurrently, or substantially contemporaneously, with a facial image obtained from the photo identification. Likewise, in some embodiments, biometric samples may include fingerprint samples as well as a variety of other user biometrics that can be used for authentication purposes. In some cases, one or more additional copies of a user's biometric sample(s) may be securely stored on a client device and/or on a backend authentication system as well.

In operation, the one or more biometric samples may be compared to confirm or disconfirm that the person presenting the user credential and real time biometric sample are the same person. In other words, the one or more biometric samples described herein may be variously compared to authenticate the user. Likewise, in at least some embodiments, the credential data extracted or captured from the user credential presented by the user may be compared to stored credential data to confirm that the data extracted or captured from the user credential is valid, up to date, accurate, correct, and the like. In other words, the credential data may be validated, in addition to the authentication steps described herein.

The systems and methods described herein may be implemented using computer programming or engineering techniques including computer software, firmware, hardware or any combination or subset thereof, wherein the technical effects and specific improvements to the technology and technical field may include one or more of: (a) providing In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for authenticating a user, the system comprising:
    a memory device having computer executable instructions stored therein; and
    a processor coupled to the memory device and configured to execute the computer executable instructions that, when executed, cause the processor to at least:
        receive a first live biometric sample associated with a user from a biometric measurement device, the first live biometric sample captured by the biometric measurement device;
        receive, within a predefined time period of receiving the first live biometric sample, an image of a user credential captured substantially contemporaneously as a single image with the first live biometric sample by the biometric measurement device, the image including credential data, wherein the user credential is an identification document or an image of an identification document including credential data and biometric data;
        compare the first live biometric sample to at least one of: i) a second biometric sample included in the credential data, or ii) a third biometric sample stored by an authentication database in association with the user;
        determine, in response to and based upon the comparison, whether to authenticate the user; and
        determine, in response to and based upon the comparison, whether the first live biometric sample matches at least one of: i) the second biometric sample included in the credential data, or ii) the third biometric sample stored by the authentication database;
        in response to determining a mismatch between the first live biometric sample and at least one of the second biometric sample or the third biometric sample, generate a fraud alert; and
        transmit the fraud alert to a third party system.

2. The system of claim 1, wherein the computer executable instructions, when executed, further cause the processor to at least:
    generate, in response to determining whether to authenticate the user, an authentication outcome; and
    transmit the authentication outcome to the third party system.

3. The system of claim 1, wherein the credential data encodes the second biometric sample, and wherein the computer executable instructions, when executed, further cause the processor to at least:
    decode the encoded second biometric sample.

4. The system of claim 1, wherein the credential data includes personally identifiable information of the user, and wherein the computer executable instructions, when executed, further cause the processor to at least:
    retrieve the third biometric sample from authentication database using the personally identifiable information.

5. The system of claim 1, wherein the credential data encodes personally identifiable information of the user, and wherein the computer executable instructions, when executed, further cause the processor to at least:
    decode the encoded personally identifiable information.

6. A system for authenticating a user, the system comprising:
a memory device having computer executable instructions stored therein; and
a processor coupled to the memory device and configured to execute the computer executable instructions that, when executed, cause the processor to at least:
receive a first live facial image associated with a user from an image capture device, the first live facial image captured by the image capture device;
receive, within a predefined time period of receiving the first live facial image, an image of a user credential captured substantially contemporaneously as a single image with the first live facial image by the image capture device, the image including a second facial image, wherein the user credential is an identification document or an image of an identification document including credential data and biometric data;
compare the first live facial image to at least one of: i) the second facial image included in the user credential, or ii) a third facial image stored by an authentication database in association with the user;
determine, in response to and based upon the comparison, whether to authenticate the user; and
determine, in response to and based upon the comparison, whether the first live facial image matches at least one of: i) the second facial image included in the user credential, or ii) the third facial image stored by the authentication database;
in response to determining a mismatch between the first live facial image and at least one of the second facial image or the third facial image, generate a fraud alert; and
transmit the fraud alert to a third party system.

7. The system of claim 6, wherein the computer executable instructions, when executed, further cause the processor to at least:
generate, in response to determining whether to authenticate the user, an authentication outcome; and
transmit the authentication outcome to the third party system.

8. The system of claim 6, wherein the user credential encodes the second facial image, and wherein the computer executable instructions, when executed, further cause the processor to at least:
decode the encoded second facial image.

9. The system of claim 6, wherein the user credential includes personally identifiable information of the user, and wherein the computer executable instructions, when executed, further cause the processor to at least:
retrieve the third facial image from authentication database using the personally identifiable information.

10. The system of claim 6, wherein the user credential encodes personally identifiable information of the user, and wherein the computer executable instructions, when executed, further cause the processor to at least:
decode the encoded personally identifiable information.

11. A system for authenticating a user, the system comprising:
a memory device having computer executable instructions stored therein; and
a processor coupled to the memory device and configured to execute the computer executable instructions that, when executed, cause the processor to at least:
receive a first live fingerprint sample associated with a user from biometric measurement device, the first live fingerprint sample captured by the biometric measurement device;
receive, within a predefined time period of receiving the first live fingerprint sample, an image of a user credential captured substantially contemporaneously as a single image with the first live fingerprint sample by the biometric measurement device, wherein the user credential is an identification document or an image of an identification document including credential data and biometric data;
compare the first live fingerprint sample to a second fingerprint sample stored by an authentication database in association with the user; and
determine, in response to and based upon the comparison, whether to authenticate the user; and
determine, in response to and based upon the comparison, whether the first live fingerprint sample matches the second finger sample stored by the authentication database;
in response to determining a mismatch between the first live fingerprint sample and the second fingerprint sample, generate a fraud alert; and
transmit the fraud alert to a third party system.

12. The system of claim 11, wherein the computer executable instructions, when executed, further cause the processor to at least:
generate, in response to determining whether to authenticate the user, an authentication outcome; and
transmit the authentication outcome to the third party system.

13. The system of claim 11, wherein the computer executable instructions, when executed, further cause the processor to at least:
determine, in response to and based upon the comparison, whether the first live fingerprint sample matches at least one of: i) the second fingerprint sample stored by the authentication database, or ii) a third fingerprint sample encoded on the user credential.

14. The system of claim 11, wherein the user credential encodes a third fingerprint sample, and wherein the computer executable instructions, when executed, further cause the processor to at least:
decode the encoded third fingerprint sample.

15. The system of claim 11, wherein the user credential includes personally identifiable information of the user, and wherein the computer executable instructions, when executed, further cause the processor to at least:
retrieve the second fingerprint sample from database using the personally identifiable authentication information.

16. The system of claim 1, wherein the predefined time period is one of 5 milliseconds, 1 second, 10 seconds, 30 seconds, 60 seconds, 1 minute, or 5 minutes.

* * * * *